No. 868,483. PATENTED OCT. 15, 1907.
F. H. REID.
CENTRIFUGAL LIQUID SEPARATOR.
APPLICATION FILED NOV. 8, 1906.
2 SHEETS—SHEET 2.
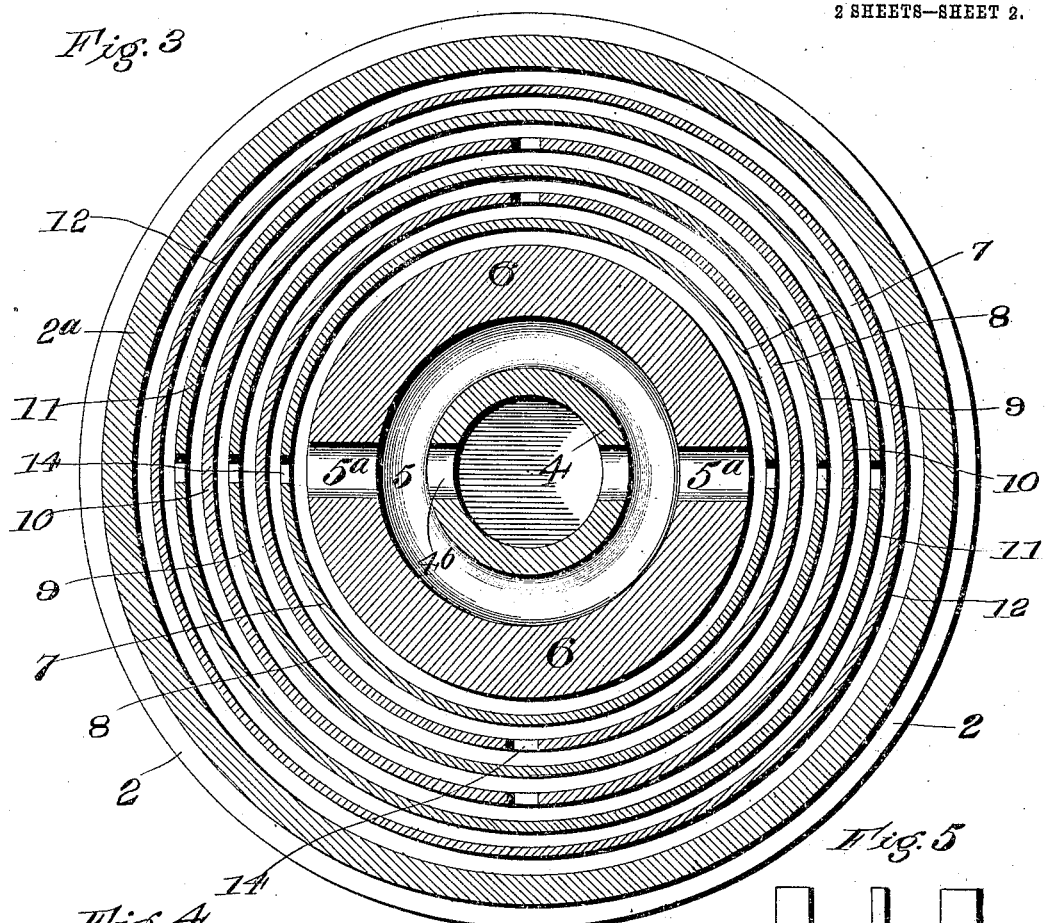
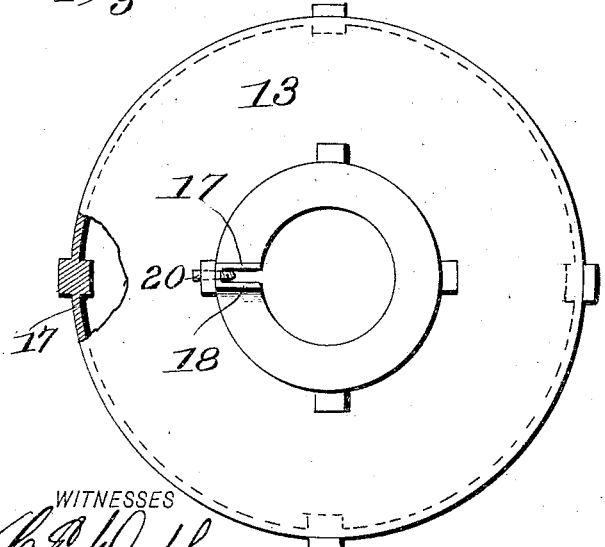
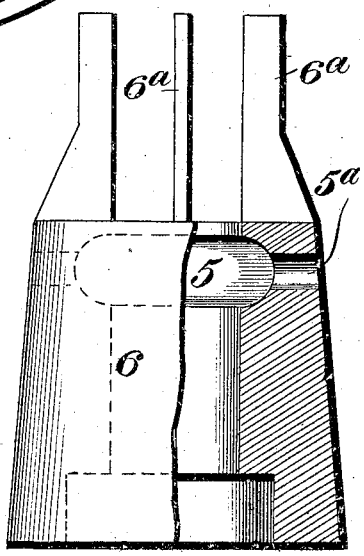
INVENTOR
FREDDIE H. REID
BY Munn & Co.
ATTORNEYS

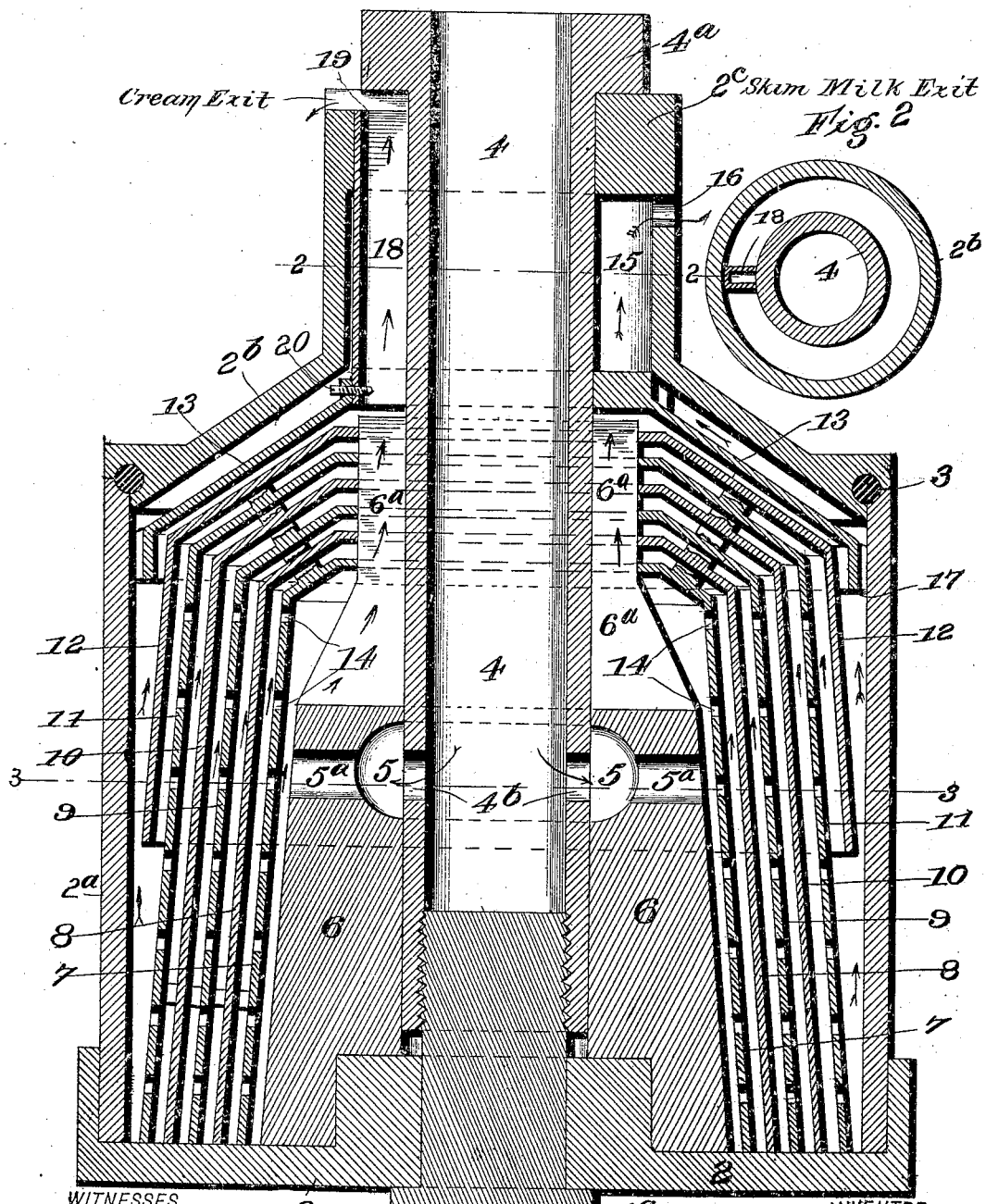

UNITED STATES PATENT OFFICE.

FREDDIE H. REID, OF SIOUX CITY, IOWA.

CENTRIFUGAL LIQUID-SEPARATOR.

No. 868,483.            Specification of Letters Patent.            Patented Oct. 15, 1907.

Application filed November 8, 1906. Serial No. 342,461.

*To all whom it may concern:*

Be it known that I, FREDDIE H. REID, a citizen of the United States, and a resident of Sioux City, in the county of Woodbury and State of Iowa, have invented an Improved Centrifugal Liquid-Separator, of which the following is a specification.

My invention is an improvement upon that for which I have made application for Letters Patent No. 311,924. I have simplified and improved the construction and increased the efficiency of the original apparatus in the manner illustrated in the accompanying drawings, in which Figure 1 is a central vertical section of my improved separator. Fig. 2 is a cross section on the line 2—2 of Fig. 1, the same being reduced in diameter. Fig. 3 is a horizontal section on the line 3—3 of Fig. 1. Fig. 4 is a plan view of a portion of the apparatus termed the divider and which finally divides the cream from the skimmed milk. Fig. 5 is in part a side view and in part a vertical section of a portion of the apparatus termed the distributing core.

In Fig. 1 the numeral 1 indicates a vertical shaft which in practice is journaled in a suitable frame and to which rotation at any required speed is imparted by a motor. The separator proper is mounted and supported upon this shaft which is provided with a collar 1ª for the purpose. The bowl of the separator comprises a horizontal flanged base 2 which seats on the collar 1ª, a cylindrical body 2ª and top part 2ᵇ being formed with a vertical cylindrical portion and a downwardly inclined lateral portion, the two being connected at the top of the drum or cylinder 2ª where a gasket 3 is inserted to form a liquid-tight joint.

In place of extending the shaft 1 to the top of the separator proper, as in my former invention, it extends but a short distance above the base 2ª of the bowl of the separator proper, and a tube 4 is screwed thereon, the same extending above the top of the bowl where it is provided with a collar 4ª that rests on the inwardly projecting collar 2ᶜ formed on the top portion 2ᵇ of the bowl. It is obvious that by screwing down the tube 4 it will hold the parts composing the bowl in close contact so as to form liquid-tight joints. Near its lower end the tube 4 is provided with lateral openings 4ᵇ through which the full milk is discharged into an annular chamber 5 formed in the upper portion of the slotted piece 6, which, in view of its position and function, may be conveniently designated as the distributing core. From the annular chamber 5 passages 5ª lead outward, or laterally, and from these the full milk is discharged. The upper portion of the core 6 is formed, see Figs. 1 and 5, of a series of thin blades 6ª which project upward alongside, and in contact with, the tube 4. These blades 6ª serve as guides and supports for a series of skimming, or separating, plates and a cover therefor, the same being indicated by the numerals 7, 8, 9, 10, 11, 12. All of these parts may be said to approximate a cone in form, the upper portions being bent twice at an obtuse angle and the body or lower portion being nearly vertical, that is to say, as nearly so as permissible in view of the space required for the divider, or dividing plate, 13, arranged above the cover plate 12.

The several parts 7 to 12, inclusive, are held spaced from each other by means of blocks or bosses, as is usual in this class of machines. The upper or angular portions of the several skimming plates are imperforate, but the approximately vertical portions are provided with a series of perforations. It is, however, a distinguishing feature of my invention that the perforations of the one plate do not coincide with those of the next. In other words, the openings 14 are arranged staggered, or what may be termed quartering. Thus, there are two openings in each of the skimming plates and they are arranged diametrically opposite, as will be seen in Fig. 3, and the plates are so adjusted that the openings of one are removed 90° from those of the next one.

The full milk is delivered into the top of the tube 4 and passes through the openings 4ᵇ in its lower portion into the annular space, or chamber, 5 in the distributing core, whence it is delivered from the lower openings 5ª into contact with the inner side of the inner skimming plate 7, whereby it is spread out into a thin annular sheet or over the entire surface of the perforated portion of such plate. The separation of the cream from the milk begins at this point. The liquid can find exit only through the openings 14 in the plate 7, that is to say on two opposite sides of said plate, and in passing therefrom is delivered into contact with the imperforate portions of the second plate 8, where it is again spread out into a thin sheet, and must travel a quarter around the circumference of the plate 8 before it can find exit therefrom. Thus passage of the liquid through the several plates involves a lateral travel of 90° for each plate in the series. During all the time that the liquid is making this passage the cream is being separated from the milk. The milk which reaches the last or outer skimming plate contains little or perhaps no cream and is properly skim milk. This forms a layer against the inner side of the drum, or cylinder 2ª and passes upward along the side of the same and in contact with the conical portion of the top 2ᵇ into the chamber 15 therein, whence it escapes through the lateral opening 16, see Fig. 1. The cream as is well understood is not diverted or carried out so far by centrifugal action, owing to its lesser weight. If any remains with the milk at the last it is removed and finally separated from the skimmed milk at the point 17, Fig. 1, where it passes between the cover plate 12 and divider 13 and is thus conducted along the under surface of the latter and into the vertical passage 18.

It is to be understood that the machine or apparatus will in practice be provided with receiving pans for cream and milk which are discharged laterally, the same being suitably arranged upon the neck or top of the separator. The guide passage 18 is formed of a channel piece, see Fig. 4, which is secured permanently to the divider 13 by a screw 20 and also by soldering. The imperforate cover plate 12 extends downward from the series of skimming plates proper 7—11, to about the middle of the length of their lower portions so that the milk escaping through the upper openings of the outer skimming plate 11 must pass down below the lower edge of the cover plate 12 in order to find final exit in contact with the inner side of the drum $2^a$. In other words, the cover plate serves to guide the milk downward so that it is more completely distributed against the side of the drum $2^a$ before passing upward to be finally separated by the divider 13. It will be noted also that the blades $6^a$ projecting upward from the body of the core distributer 6 provide spaces or channels through which the cream may pass upward until it reaches the dividing plate 13, from which it escapes through the conductor 18. It will be understood, however, that this largest portion of the cream is that which is separated in the first contact of the liquid with the skimming plates 7, 8, 9.

Experience has demonstrated that milk and cream are separated effectively or completely by my improved construction and arrangement of parts constituting the separator proper. Further, by the improved arrangement of the dividing plate 13, I have distributed the cream walls or surfaces so that they are comparatively short and therefore the cream is delivered from the separator bowl more rapidly and has greater density.

I claim—

1. In a separator of the class indicated, the combination, with the vertical shaft 1, the bowl 2, $2^a$, seated thereon, a series of bowl-shape perforated skimming plates contained within the bowl proper, the milk tube 4 having lateral openings and screwed upon the end of said shaft projecting above the base of the bowl, of the distributing core 6, arranged concentrically with the milk tube, and having an annular chamber 5, and lateral orifices $5^a$ in register with the discharge openings of the milk tube, the core having also a series of vertical blades $6^a$ projecting from its top portion and spaced apart, their inner edges abutting the milk tube, and thus forming a series of vertical passages between said tube and the inner skimming plate, as shown and described.

2. In a separator of the class indicated, the combination with the vertical shaft 1, the bowl seated thereon, the milk-conducting tube 4 having lateral discharge openings, the distributing core 6 surrounding the tube and having lateral openings, and a series of spaced projections $6^a$ extending upward, their inner edges being in contact with the milk tube, a series of inverted bowl-shape skimming plates held on said projections of the core, and a dividing plate 13 fixed on the tube 4 and extending over the tops of the said projections and part way down over the outer skimming plate, and having the vertical cream-conductor 18, which extends upward from the top of the said dividing plate and connecting with an exit opening in the top of the bowl, a continuous cream passage being thus formed by and between the vertical projections of the core and the said conductor 18, as shown and described.

FREDDIE H. REID.

Witnesses:
C. A. PATCH,
WM. H. FOUKE.